United States Patent
Yang et al.

(10) Patent No.: US 12,531,972 B2
(45) Date of Patent: Jan. 20, 2026

(54) TECHNIQUES FOR GUIDING PERSPIRATION TO DESIRED CHANNELS TO AVOID NEGATIVE IMPACTS TO ELECTRICAL AND MECHANICAL FUNCTIONS OF EXTENDED-REALITY DEVICES, AND SYSTEMS AND METHODS OF USE THEREOF

(71) Applicant: Meta Platforms Technologies, LLC, Menlo Park, CA (US)

(72) Inventors: Shannon X Yang, Newcastle, WA (US); Timothy Pier, Shoreline, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 18/782,385

(22) Filed: Jul. 24, 2024

(65) Prior Publication Data
US 2025/0224617 A1    Jul. 10, 2025

Related U.S. Application Data

(60) Provisional application No. 63/618,853, filed on Jan. 8, 2024.

(51) Int. Cl.
*G02B 27/01* (2006.01)
*F04D 29/40* (2006.01)
(Continued)

(52) U.S. Cl.
CPC ......... *H04N 13/361* (2018.05); *F04D 29/403* (2013.01); *F04D 29/665* (2013.01);
(Continued)

(58) Field of Classification Search
CPC .................. G02B 27/0176; G02B 2027/0161
See application file for complete search history.

(56) References Cited

U.S. PATENT DOCUMENTS

| | | |
|---|---|---|
| 11,435,593 B1 | 9/2022 | Sztuk et al. |
| 11,507,203 B1 | 11/2022 | Bosworth |

(Continued)

FOREIGN PATENT DOCUMENTS

| | | |
|---|---|---|
| AU | 2017220404 B2 | 6/2019 |
| WO | 2017117675 A1 | 7/2017 |
| WO | 2018090882 A1 | 5/2018 |

OTHER PUBLICATIONS

European Search Report for European Patent Application No. 25150733.1, dated Feb. 4, 2025, 8 pages.
(Continued)

*Primary Examiner* — Kwang-Su Yang
(74) *Attorney, Agent, or Firm* — McDermott Will & Schulte LLP

(57) ABSTRACT

An example MR headset is provided. The MR headset includes a two-part housing configured to house electronic and mechanical components used to present MR content, the two-part housing including a first part of the two-part housing and a second part of the two-part housing. And the MR headset includes a channel defined by a first perimeter of the first part of the two-part housing and a second perimeter of the second part of the two-part housing. The channel is configured to guide perspiration along the first perimeter of the first part or the second perimeter of the second part away from the electronic and mechanical components housed in the two-part housing.

20 Claims, 10 Drawing Sheets

(51) Int. Cl.
- *F04D 29/66* (2006.01)
- *H04N 13/254* (2018.01)
- *H04N 13/344* (2018.01)
- *H04N 13/361* (2018.01)
- *H04N 13/366* (2018.01)
- *H04R 1/10* (2006.01)
- *H04R 1/28* (2006.01)
- *H04R 1/40* (2006.01)
- *H04R 3/00* (2006.01)
- *H05B 45/34* (2020.01)
- *H05B 47/28* (2020.01)

(52) U.S. Cl.
CPC ....... *G02B 27/0176* (2013.01); *H04N 13/254* (2018.05); *H04N 13/344* (2018.05); *H04N 13/366* (2018.05); *H04R 1/1008* (2013.01); *H04R 1/1075* (2013.01); *H04R 1/1083* (2013.01); *H04R 1/288* (2013.01); *H04R 1/406* (2013.01); *H04R 3/005* (2013.01); *H05B 45/34* (2020.01); *H05B 47/28* (2020.01); *G02B 2027/0161* (2013.01); *H04R 2201/401* (2013.01); *H04R 2410/01* (2013.01); *H04R 2460/01* (2013.01); *H04R 2499/15* (2013.01)

(56) References Cited

U.S. PATENT DOCUMENTS

| | | |
|---|---|---|
| 2017/0287194 A1 | 10/2017 | Katz et al. |
| 2019/0258058 A1 | 8/2019 | Fortin-Desch et al. |
| 2021/0022430 A1* | 1/2021 | Hashimoto ............ A42B 3/046 |
| 2021/0385954 A1* | 12/2021 | Chang .................. H05K 5/0217 |
| 2023/0185386 A1 | 6/2023 | Bosworth |
| 2024/0012450 A1 | 1/2024 | Berliner et al. |
| 2024/0069596 A1* | 2/2024 | Kollgaard ............... G06F 1/163 |
| 2024/0377638 A1* | 11/2024 | Wang .................. G02B 27/0172 |

OTHER PUBLICATIONS

EPO—International Search Report and Written Opinion for International Application No. PCT/US2025/010799, mailed Jun. 3, 2025, 21 pages.

* cited by examiner

500 

510 Couple a first part of a two-part housing and a second part of a two-part housing.

520 Form a channel defined by a first perimeter of the first part of the two-part housing and a second perimeter of the second part of the two-part housing.

530 The channel is configured to guide perspiration along the first perimeter of the first part or the second perimeter of the second part.

540 The channel includes a set of path irregularities, each respective path irregularity configured to:

reduce a flow velocity of the perspiration being guided along the first perimeter of the first part or the second perimeter of the second part;

increase a path length of the channel such that perspiration guided along the first perimeter of the first part, or the second perimeter of the second part travels a longer path before reaching an end of the channel; and/or increase a volumetric perspiration capacity of the channel.

550 The set of path irregularities includes one or more pockets defined in the first perimeter or the second perimeter, the pockets configured to collect perspiration being guided along the channel.

560 The set of path irregularities includes a tortuous path that deviates from a direction along the first perimeter or the second perimeter.

570 The channel includes a hydrophilic portion configured to receive perspiration guided along the channel, and the channel includes a hydrophobic portion configured to repel perspiration guided along the channel.

Figure 5

TECHNIQUES FOR GUIDING PERSPIRATION TO DESIRED CHANNELS TO AVOID NEGATIVE IMPACTS TO ELECTRICAL AND MECHANICAL FUNCTIONS OF EXTENDED-REALITY DEVICES, AND SYSTEMS AND METHODS OF USE THEREOF

RELATED APPLICATIONS

This application claims priority to U.S. Prov. App. No. 63/618,853, filed on Jan. 8, 2024, and titled "Arrangements of Imaging and Illumination Sensors for Extended-reality Headset, Physical Button for Passthrough Mode, Drop Protection and Audio Improvements for the Headset, and Systems and Methods of Use Thereof," which is hereby incorporated by reference in its entirety.

TECHNICAL FIELD

This relates generally to a head-wearable device and components thereof, including, but not limited to, head-wearable devices including channels for guiding perspiration so as to avoid negatively impacting electrical and mechanical functions of extended-reality devices.

BACKGROUND

Users of mixed-reality (MR) headsets can become substantially immersed in the MR content presented by such MR headsets, which can be conducive to a richer, more engaging user experience. However, one drawback of such immersion while wearing a MR headset is that the user's perspiration can become trapped within a portion of the MR headset that houses the electronic and mechanical components, potentially causing damage to the MR headset, or otherwise detracting from the immersive experience.

As such, there is a need to address one or more of the above-identified challenges. A brief summary of solutions to the issues noted above are described below.

SUMMARY

The methods, systems, and devices described herein provide several improvements to a head-wearable device. In particular, the systems and methods disclosed herein provide improvements for guiding perspiration so as to avoid negatively impacting electrical and mechanical functions of extended-reality (XR) devices, and other improvements. The methods, systems, and devices described herein improve the functionality of a head-wearable device while also reducing overall costs. The embodiments described herein may be particularly beneficial for MR headsets having a smaller outward profile (e.g., a slimmer thickness) as the electronic and mechanical components of such system may be located closer to the user's skin where the user is likely to perspire onto them.

One example of a MR headset is described herein. The example MR headset includes a two-part housing that includes a first part of the two-part housing, a second part of the two-part housing, and a channel defined by a first perimeter of the first part of the two-part housing and a second perimeter of the second part of the two-part housing. The channel is configured to guide perspiration along the first perimeter of the first part or the second perimeter of the second part away from the electronic and mechanical components housed in the two-part housing.

In some embodiments, a two-part housing is provided that is configured to be used with a MR headset. The two-part housing includes each of the features of the example MR headset described above.

In some embodiments, a method of assembling a MR headset is provided. The method of assembling the MR headset includes coupling a first part of a two-part housing and a second part of a two-part housing, thereby forming a channel defined by a first perimeter of the two-part housing and a second perimeter of the two-part housing. The channel is configured to guide perspiration along the first perimeter of the first part or the second perimeter of the second part away from the electronic and mechanical components housed in the two-part housing.

The devices and/or systems described herein can be configured to include instructions that cause performance of methods and operations associated with the presentation and/or interaction with XR. These methods and operations can be stored on a non-transitory computer-readable storage medium of a device or a system. It is also noted that the devices and systems described herein can be part of a larger overarching system that includes multiple devices. A non-exhaustive list of electronic devices that can either alone or in combination (e.g., a system) include instructions that cause performance of methods and operations associated with the presentation and/or interaction with an XR can include: an XR headset (e.g., a MR headset or an augmented-reality (AR) headset), a wrist-wearable device, an intermediary processing device, a smart textile-based garment, etc. For example, when an XR headset is described, it is understood that the XR headset can be in communication with one or more other devices (e.g., a wrist-wearable device, a server, intermediary processing device, etc.), which in combination can include instructions for performing methods and operations associated with the presentation and/or interaction with an XR (e.g., the XR headset would be part of a system that includes one or more additional devices). Multiple combinations with different related devices are envisioned, but not recited for brevity.

The features and advantages described in the specification are not necessarily all inclusive and, in particular, certain additional features and advantages will be apparent to one of ordinary skill in the art in view of the drawings, specification, and claims. Moreover, it should be noted that the language used in the specification has been principally selected for readability and instructional purposes.

Having summarized the above example aspects, a brief description of the drawings will now be presented.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 4A, 4B, and 4C-1, and 4C-2 illustrate example MR and AR systems, in accordance with some embodiments.

FIG. 5 illustrates an example method for assembling a two-part housing for guiding perspiration to desired channels to avoid negative impacts to electrical and mechanical functions of a MR headset, in accordance with some embodiments.

Figure 1A:
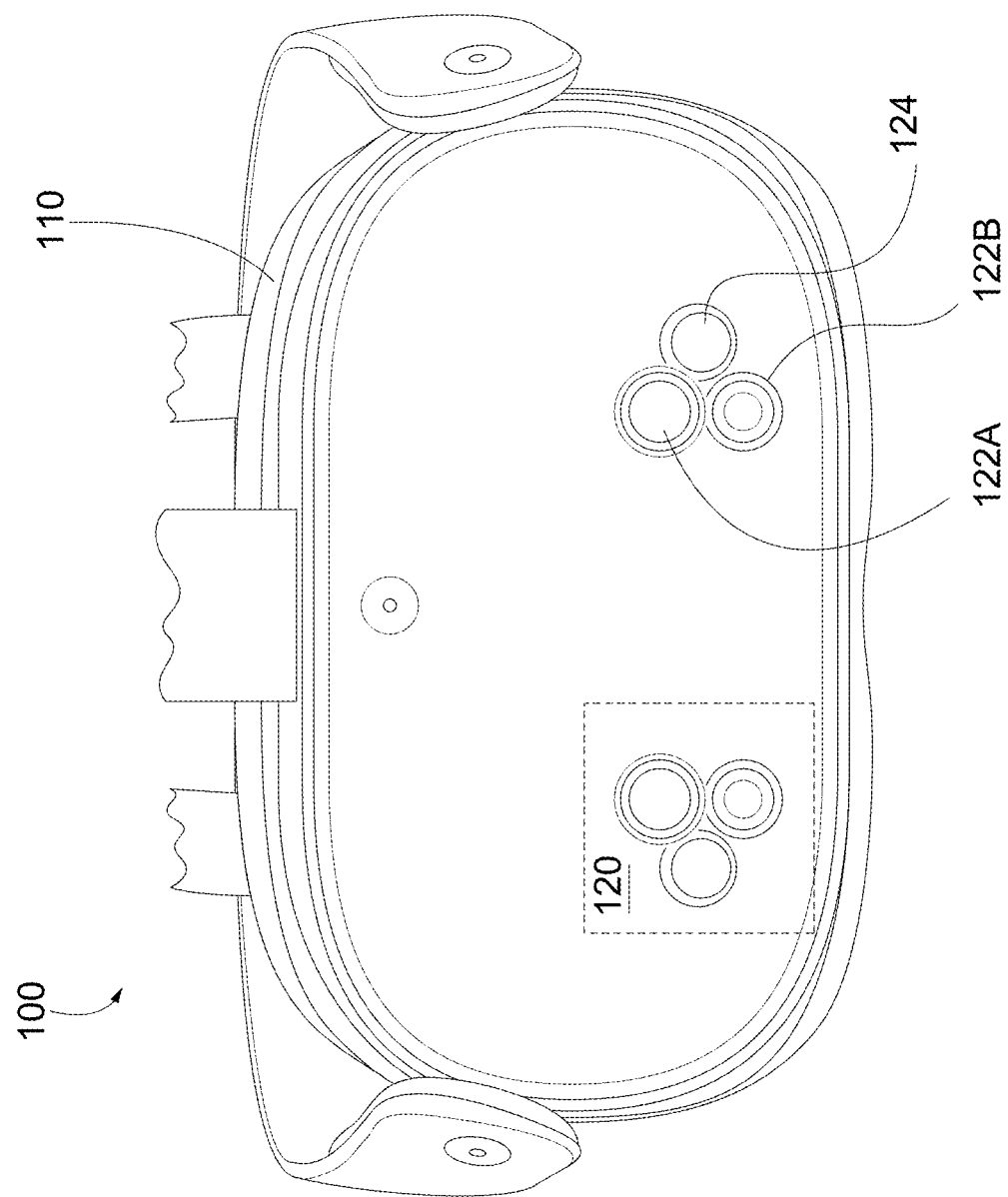
FIGS. 1A to 1D illustrates an example head-wearable device, in accordance with some embodiments.

In accordance with customary practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Embodiments of this disclosure can include or be implemented in conjunction with distinct types of XR systems such as MR and AR systems. MR and AR, as described herein, are any superimposed functionality and or sensory-detectable presentation provided by MR and AR systems within a user's physical surroundings. Such MRs can include and/or represent virtual realities and virtual realities in which at least some aspects of the surrounding environment are reconstructed within the virtual environment (e.g., displaying virtual reconstructions of physical objects in a physical environment to avoid the user colliding with the physical objects in a surrounding physical environment). In the case of MRs, the surrounding environment that is presented via a display is captured by one or more sensors configured to capture the surrounding environment (e.g., a camera sensor or a Time of flight (ToF) sensor). While the wearer of a MR headset can see the surrounding environment in full detail, they are seeing a reconstruction of the environment reproduced by using data from one or more sensors (i.e., the physical objects are not directly viewed by the user).

A MR headset can also forgo displaying reconstructions of objects in the physical environment, thereby providing a user with an entirely virtual reality (VR) experience. An AR system, on the other hand, provides an experience in which information is provided, e.g., through the use of a waveguide, in conjunction with the direct viewing of at least some of the surrounding environment through a transparent or semi-transparent waveguide(s) and/or lens(es) of the AR headset. Throughout this application the term XR is used to cover both ARs and MRs. In addition, this application also uses, at times, head-wearable device, or headset device to describe headsets such as AR headsets and MR headsets.

As alluded to above, a MR environment, as described herein, can include, but is not limited to, non-immersive, semi-immersive, and fully immersive VR environments. As also alluded to above, AR environments can include marker-based AR environments, markerless AR environments, location-based AR environments, and projection-based AR environments. The above descriptions are not exhaustive and any other environment that allows for intentional environmental lighting to pass through to the user would fall within the scope of AR and any other environment that does not allow for intentional environmental lighting to pass through to the user would fall within the scope of MR.

The AR and MR content can include video, audio, haptic events, or some combination thereof, any of which can be presented in a single channel or in multiple channels (such as stereo video that produces a three-dimensional effect to a viewer). Additionally, AR and MR can also be associated with applications, products, accessories, services, or some combination thereof, which are used, for example, to create content in an AR or MR environment and/or are otherwise used in (e.g., to perform activities in) AR and MR environments.

Interacting with these AR and MR environments described herein can occur using multiple different modalities and the resulting outputs can also occur across multiple different modalities. In one example of an AR or MR system, a user can perform a swiping in-air hand gesture to cause a song to be skipped by a song-providing application that is providing playback at, for example, a home speaker.

A hand gesture, as described herein, can include an in-air gesture, a surface-contact gesture and/or other gestures that can be detected and determined based on movements of a single hand (e.g., a one-handed gesture performed with a user's hand that is detected by one or more sensors of a wearable device (e.g., electromyography (EMG) and/or inertial measurement units (IMU)s of a wrist-wearable device, and/or one or more sensors included in a smart textile wearable device) and/or detected via image data captured by an imaging device of a wearable device (e.g., a camera of a head-wearable device, an external tracking camera setup in the surrounding environment, etc.)). In-air means that the user's hand does not contact a surface, object, or portion of an electronic device (e.g., a head-wearable device or other communicatively coupled device, such as the wrist-wearable device), in other words, the gesture is performed in open air in 3D space and without contacting a surface, an object, or an electronic device. Surface-contact gestures (contacts at a surface, object, body part of the user, or electronic device) more generally are also contemplated in which a contact (or an intention to contact) is detected at a surface (e.g., a single- or double-finger tap on a table, on a user's hand or another finger, on the user's leg, a couch, a steering wheel, etc.). The different hand gestures disclosed herein can be detected using image data and/or sensor data (e.g., neuromuscular signals sensed by one or more biopotential sensors (e.g., EMG sensors) or other types of data from other sensors, such as proximity sensors, ToF sensors, sensors of an IMU, capacitive sensors, strain sensors, etc.) detected by a wearable device worn by the user and/or other electronic devices in the user's possession (e.g., smartphones, laptops, imaging devices, intermediary devices, and/or other devices described herein).

The input modalities as alluded to above can be varied and dependent on a user experience. For example, in an interaction in which a wrist-wearable device is used, a user can provide inputs using in-air or surface-contact gestures that are detected using neuromuscular signal sensors of the wrist-wearable device. In the event that a wrist-wearable device is not used, alternative and entirely interchangeable input modalities can be used instead, such as camera(s) located on the headset or elsewhere to detect in-air or surface-contact gestures or inputs at an intermediary processing device (e.g., through physical input components (e.g., buttons and trackpads)). These different input modalities can be interchanged based on both desired user experiences, portability, and/or a feature set of the product (e.g., a low-cost product may not include hand-tracking cameras).

While the inputs are varied, the resulting outputs stemming from the inputs are also varied. For example, an in-air gesture input detected by a camera of a head-wearable device can cause an output to occur at a head-wearable device or control another electronic device different from the head-wearable device. In another example, an input detected using data from a neuromuscular signal sensor can also cause an output to occur at a head-wearable device or control another electronic device different from the head-wearable device. While only a couple of examples are described above, one skilled in the art would understand that different input modalities are interchangeable along with different output modalities in response to the inputs.

Specific operations described above may occur as a result of specific hardware. The devices described are not limiting and features on these devices can be removed or additional features can be added to these devices. The different devices can include one or more analogous hardware components. For brevity, analogous devices and components are described herein. Any differences in the devices and components are described below in their respective sections.

As described herein, a processor (e.g., a central processing unit (CPU) or microcontroller unit (MCU)), is an electronic component that is responsible for executing instructions and controlling the operation of an electronic device (e.g., a wrist-wearable device, a head-wearable device, an HIPD, a smart textile-based garment, or other computer system). There are distinct types of processors that may be used interchangeably or specifically required by embodiments described herein. For example, a processor may be (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., VR animations, such as three-dimensional modeling); (iv) a field-programmable gate array (FPGA) that can be programmed and reconfigured after manufacturing and/or customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, controllers are electronic components that manage and coordinate the operation of other components within an electronic device (e.g., controlling inputs, processing data, and/or generating outputs). Examples of controllers can include (i) microcontrollers, including small, low-power controllers that are commonly used in embedded systems and Internet of Things (IoT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs. As described herein, a graphics module is a component or software module that is designed to handle graphical operations and/or processes, and can include a hardware module and/or a software module.

As described herein, memory refers to electronic components in a computer or electronic device that store data and instructions for the processor to access and manipulate. The devices described herein can include volatile and non-volatile memory. Examples of memory can include (i) random access memory (RAM), such as dynamic RAM (DRAM), static RAM (SRAM), double data rate (DDR) RAM or other random access solid state memory devices, configured to store data and instructions temporarily; (ii) read-only memory (ROM) configured to store data and instructions permanently (e.g., one or more portions of system firmware and/or boot loaders); (iii) flash memory, magnetic disk storage devices, optical disk storage devices, other non-volatile solid state storage devices, which can be configured to store data in electronic devices (e.g., universal serial bus (USB) drives, memory cards, and/or solid-state drives (SSDs)); and (iv) cache memory configured to temporarily store frequently accessed data and instructions. Memory, as described herein, can include structured data (e.g., SQL databases, MongoDB databases, GraphQL data, or JSON data). Other examples of memory can include (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, a power system of an electronic device is configured to convert incoming electrical power into a form that can be used to operate the device. A power system can include various components, including (i) a power source, which can be an alternating current (AC) adapter or a direct current (DC) adapter power supply; (ii) a charger input that can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals and can provide a means for input and output of data and signals. Examples of peripheral interfaces can include (i) USB and/or micro-USB interfaces configured for connecting devices to an electronic device; (ii) Bluetooth interfaces configured to allow devices to communicate with each other, including Bluetooth low energy (BLE); (iii) near-field communication (NFC) interfaces configured to be short-range wireless interfaces for operations such as access control; (iv) POGO pins, which may be small, spring-loaded pins configured to provide a charging interface; (v) wireless charging interfaces; (vi) global-position system (GPS) interfaces; (vii) Wi-Fi interfaces for providing a connection between a device and a wireless network; and (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can include (i) imaging sensors for collecting imaging data (e.g., including one or more cameras disposed on a respective electronic device, such as a simultaneous localization and mapping (SLAM) camera(s)); (ii) biopotential-signal sensors; (iii) IMU for detecting, for example, angular rate, force, magnetic field, and/or changes in acceleration; (iv) heart rate sensors for measuring a user's heart rate; (v) $SpO_2$ sensors for measuring blood oxygen saturation and/or other biometric data of a user; (vi) capacitive sensors for detecting changes in biopotential signals at a skin portion (e.g., an electrode-skin interface) of a user's body (e.g., a sensor-skin interface) and/or the proximity of other devices or objects; (vii) sensors for detecting some inputs (e.g., capacitive and force sensors); and (viii) light sensors (e.g., ToF sensors, infrared light sensors, or visible light sensors), and/or sensors for sensing data from the user or the user's environment. As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiography EKG) sensors configured to measure electrical activity of the heart to diagnose heart problems; (iii) EMG sensors configured to measure the electrical activity of muscles and diagnose neuromuscular disorders; (iv) electrooculography (EOG) sensors configured to measure the electrical activity of eye muscles to detect eye movement and diagnose eye disorders.

As described herein, an application stored in memory of an electronic device (e.g., software) includes instructions stored in the memory. Examples of such applications include (i) games, (ii) word processors, (iii) messaging applications, (iv) media-streaming applications, (v) financial applications, (vi) calendars, (vii) clocks, (viii) web browsers, (ix) social media applications, (x) camera applications, (xi) web-based applications, (xii) health applications, (xiii) AR and MR applications, and/or any other applications that can be stored in memory. The applications can operate in conjunction with data and/or one or more components of a device or communicatively coupled devices to perform one or more operations and/or functions.

As described herein, communication interface modules can include hardware and/or software capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document. A communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, or Bluetooth). A communication interface can refer to a software layer that enables different software programs to communicate with each other (e.g., application programming interfaces (APIs) and protocols such as HTTP and TCP/IP).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (i.e., such that the data is stored permanently until it is intentionally deleted or modified).

FIGS. 1A-1D illustrate an example MR headset, in accordance with some embodiments. The MR headset 100 includes a housing 110, one or more displays 115 (FIG. 1D), one or more object-tracking assemblies 120, and one or more processors. Additional components of the MR headset 100 are described below in reference to FIGS. 4A to 4C-2.

The housing 110 includes an interior surface and an exterior surface opposite the interior surface. The housing 110 occludes a field of view of the user while the user wears the MR headset 100 (as depicted in FIG. 4C-1 where the user 402 is wearing a MR headset 432 that may include some or all of the components of the MR headset 100). In particular, the housing 110 covers a user's eyes to allow for generation of an immersive environment. The one or more displays 115 are disposed within the interior surface of the housing such that the head-wearable device, when worn by the user, causes presentation of an XR environment. In some embodiments, the housing 110 is a two-part housing that is configured to having a first part and a second part that couple together to form a housing for electronic and mechanical components for presenting MR content.

The one or more object-tracking assemblies 120 are disposed on the exterior surface of the housing 110. Each object-tracking assembly 120 includes a plurality of imaging devices 122 (e.g., a first imaging device 122a and a second imaging device 122b) and/or one or more illumination device 124. In some embodiments, the plurality of imaging devices 122 are distinct types of imaging devices. For example, the first imaging device 122a can be a red, green and blue (RGB) camera and the second imaging device 122b can be a SLAM camera. The one or more illumination devices 124 can be one or more light-emitting diodes (LEDs), such as flood LEDs, infrared (IR) light sources, lamps, etc. In some embodiments, as will be described in more detail below, the illumination devices 124 include flood LEDs that are configured and arranged to illuminate a volume of physical space where a user will perform hand gestures for interacting with MR content.

For each object-tracking assembly 120, the plurality of imaging devices 122 is aligned on a first axis (e.g., the y-axis) and at least one illumination device 124 is aligned on a second axis, perpendicular to the first axis. The illumination device 124 is disposed at a predetermined intermediate distance between at least two imaging devices of the plurality of imaging devices (e.g., in the middle between the first and second imaging devices 122a and 122b). For example, as shown on the MR headset 100, the object-tracking assembly 120 forms a triangular arrangement on the exterior surface of the housing 110. In some embodiments, the first imaging device 122a (e.g., the RGB camera) is disposed above the second imaging device 122b (e.g., the SLAM camera) such that the first imaging device 122a is as close to user's actual field of view as possible. In some embodiments, the second imaging device 122b is angled downwards such that a field of view of the second imaging device 122b is focused on tracking a user's hands. Similarly, the illumination device 124 is slightly angled downward, in accordance with some embodiments, in order to illuminate the user's hands in order to allow for tracking of the user's hands, via the second imaging device 122b, during low light conditions, low contrast background conditions, and/or other ambient lighting conditions that negatively impact the detection of objects in image data. In some embodiments, the MR headset 100 includes at least two object-tracking assemblies 120 (e.g., first and second object-tracking assemblies 120a and 120b, where the second object-tracking assembly 120b mirrors the first object-tracking assembly 120a).

The one or more processors can be configured to execute one or more programs stored in memory communicatively coupled with the one or more processors. The one or more programs including instructions for causing the MR headset 100 to generate, via the illumination device 124, ambient lighting conditions and receive, via the plurality of imaging devices 122, image data. The one or more programs further include instructions for causing the MR headset 100 to, in accordance with a determination that the image data satisfies an object tracking threshold, present of a tracked object via the one or more displays 115. Alternatively, or in addition, the one or more programs include instructions for causing the MR headset 100 to, in accordance with a determination that the image data satisfies an object tracking threshold, detect the performance of a hand gesture. The above examples are non-limiting and the captured image data can use used for object detection, facial recognition detection, gesture detection, etc. In some embodiments, the one or more programs include instructions for causing the MR headset 100 to, in response to detection of an object and/or gesture, perform an operation or action associated with the detected object or gestures. As the skilled artisan will appreciate upon reading the descriptions provided herein, the above-example operations can be performed at the MR headset 100 and/or a device communicatively coupled with the MR headset 100 (e.g., a wrist-wearable device 1001, an HIPD 442, a server 430, a computer 440, and/or any other device described below in reference to FIGS. 4A to 4C-2).

Figure 1B:
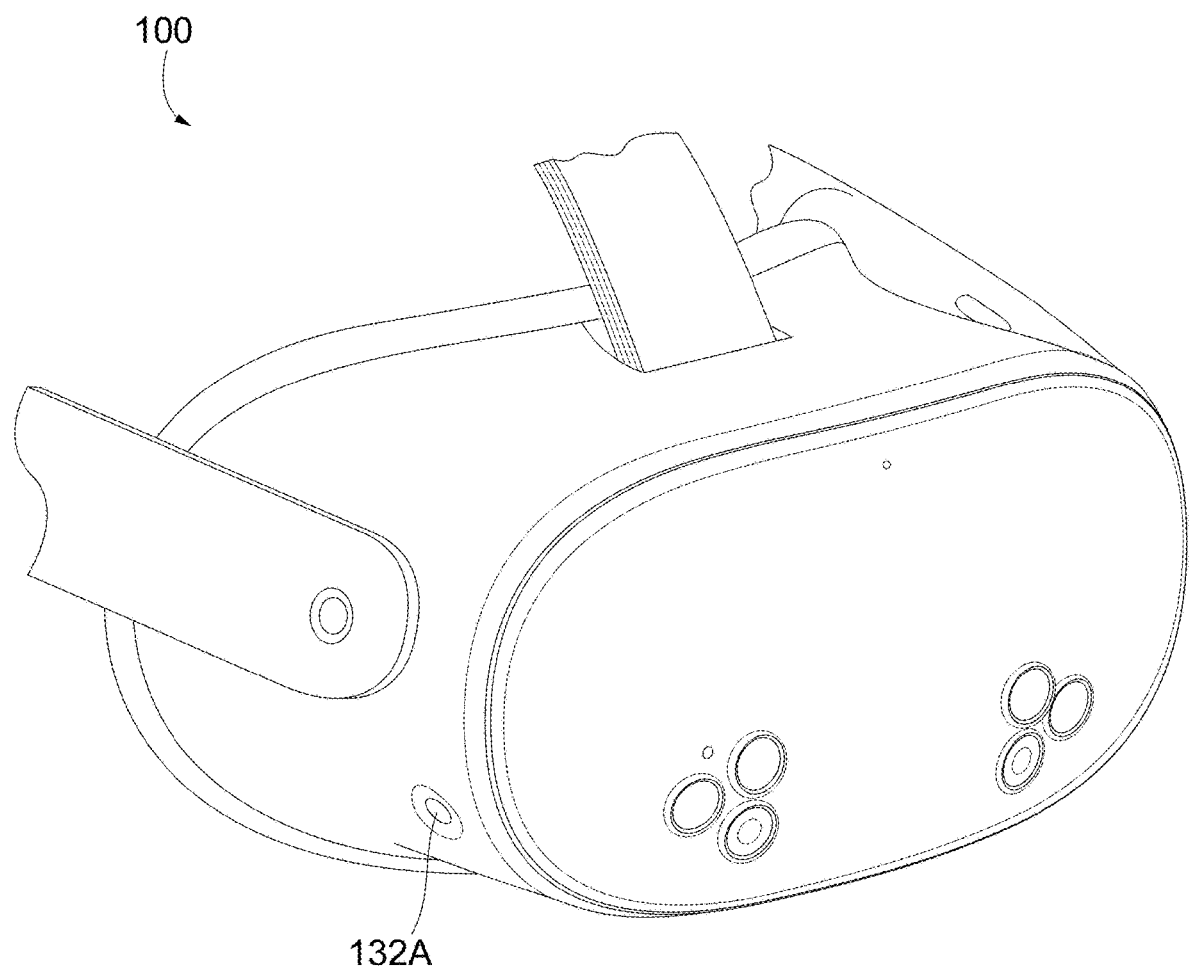

FIG. 1B shows a perspective view of the MR headset 100, in accordance with some embodiments. The perspective view of the MR headset 100 shows an additional imaging device 132a of the MR headset 100 (e.g., a respective flood LED of a second set of flood LEDs 132). The additional imaging device 132a can be an instance of the second imaging device 122b described above in reference to FIG. 1A. Alternatively, or additionally, the additional imaging device 132a is an instance of or includes the first imaging device 122a. The additional imaging device 132a can be used in conjunction with the object-tracking assembly 120 to provide full field of view coverage (e.g., increasing a field of view illuminated by one or more of the imaging devices 122). Another additional imaging device 132b is disposed on an opposite side of the MR headset 100, as shown in FIG. 1D, in accordance with some embodiments.

Figure 1C:
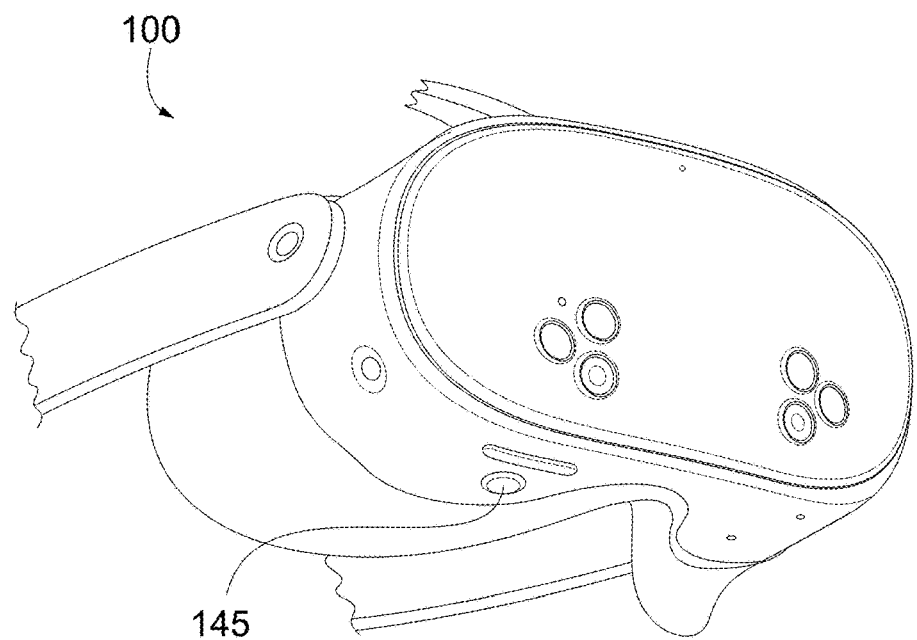

FIG. 1C shows a bottom view of the MR headset 100, in accordance with some embodiments. The bottom view of the MR headset 100 shows an input device 145 disposed on a portion of the housing. In some embodiments, the input device 145 is a physical (depressible) button. The input device 145, in response to receiving a user input (e.g., depression of the button), will cause the MR headset 100 to initiate a passthrough mode. The passthrough mode, when active, causes the MR headset 100 to present, via the displays 115, image data of a real-world environment. The image data of the real-world environment is captured by one or more imaging devices of the MR headset 100 (e.g., imaging devices 122 and/or 132). In some embodiments, the image data of the real-world environment replaces an XR environment presented by the displays 115 (e.g., removing a user from an immersive AR environment such that the user can focus on the real-world environment).

Figure 1D:
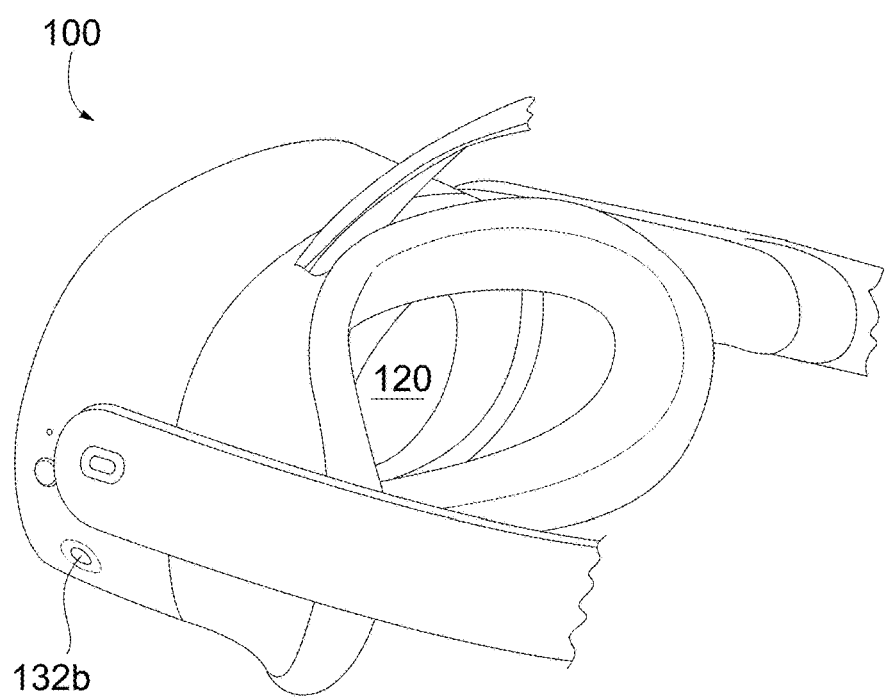

FIG. 1D show another perspective view of the MR headset 100, in accordance with some embodiments. The other perspective view 150 of the MR headset 100 shows the other additional imaging device 132b of the MR headset 100. As described above, the other additional imaging device 132b is disposed on the opposite side of the MR headset 100. The other additional imaging device 132a can be used in conjunction with the object-tracking assembly 120 to provide full field of view coverage. The other perspective view 150 of the MR headset 100 further shows an interior surface of the housing 110 and the one or more displays 115 disposed on the interior surface of the housing 110.

Figure 2:
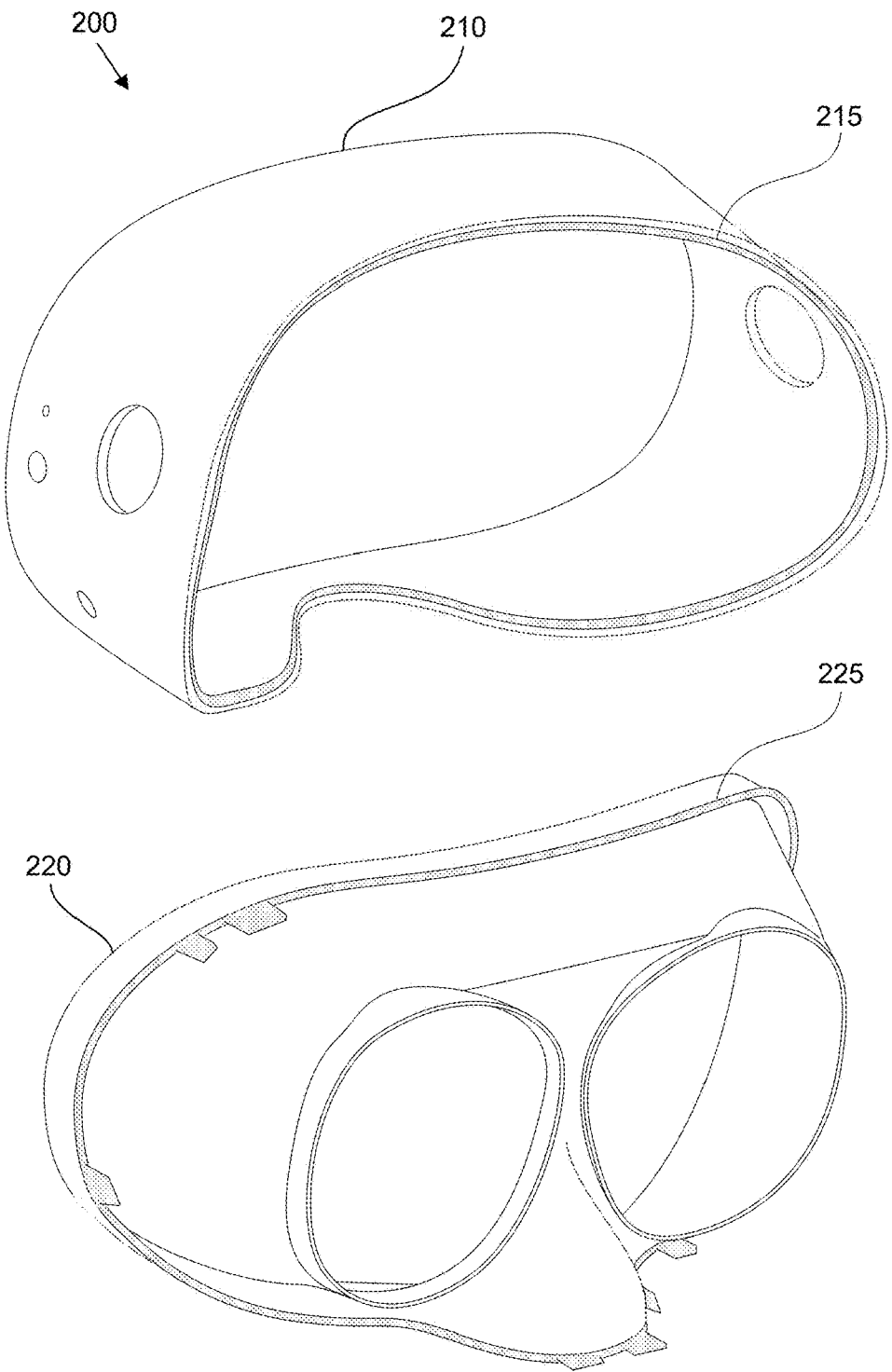
FIG. 2 illustrates example components of a two-part housing of a MR headset, in accordance with some embodiments.

FIG. 2 illustrates example components of a two-part housing 200 of the MR headset 100, in accordance with some embodiments. In accordance with some embodiments, the two-part housing 200 includes some or all of the components of the housing 110 described with respect to FIGS. 1A to 1D.

In accordance with some embodiments, the two-part housing 200 includes a first part 210 that includes one or more compartments for storing electronic and/or mechanical components for interacting with MR environments. In some embodiments, the two-part housing includes a second part 220 that is configured to couple with the first part 210 to form the housing 110. In some embodiments, the second part 220 of the two-part housing 200 defines two openings for each eye of a user of the MR headset 200. In some embodiments, the openings defined for the eyes of the user include one or more lenses for use with a presentation component of the MR headset, which may be stored within the first part 210 of the two-part housing 200.

In accordance with some embodiments, the first part 210 has a first perimeter 215, and the second part 220 has a second perimeter 225, where the first perimeter 215 and the second perimeter 220 include features such that the first part 210 and the second part 220 define a channel 300 (described in more detail with respect to FIGS. 3A and 3B) when the first part 210 and the second part 220 are coupled together (i.e., as part of the method 500 of assembling the MR headset 100 described in FIG. 5).

Figure 3A:
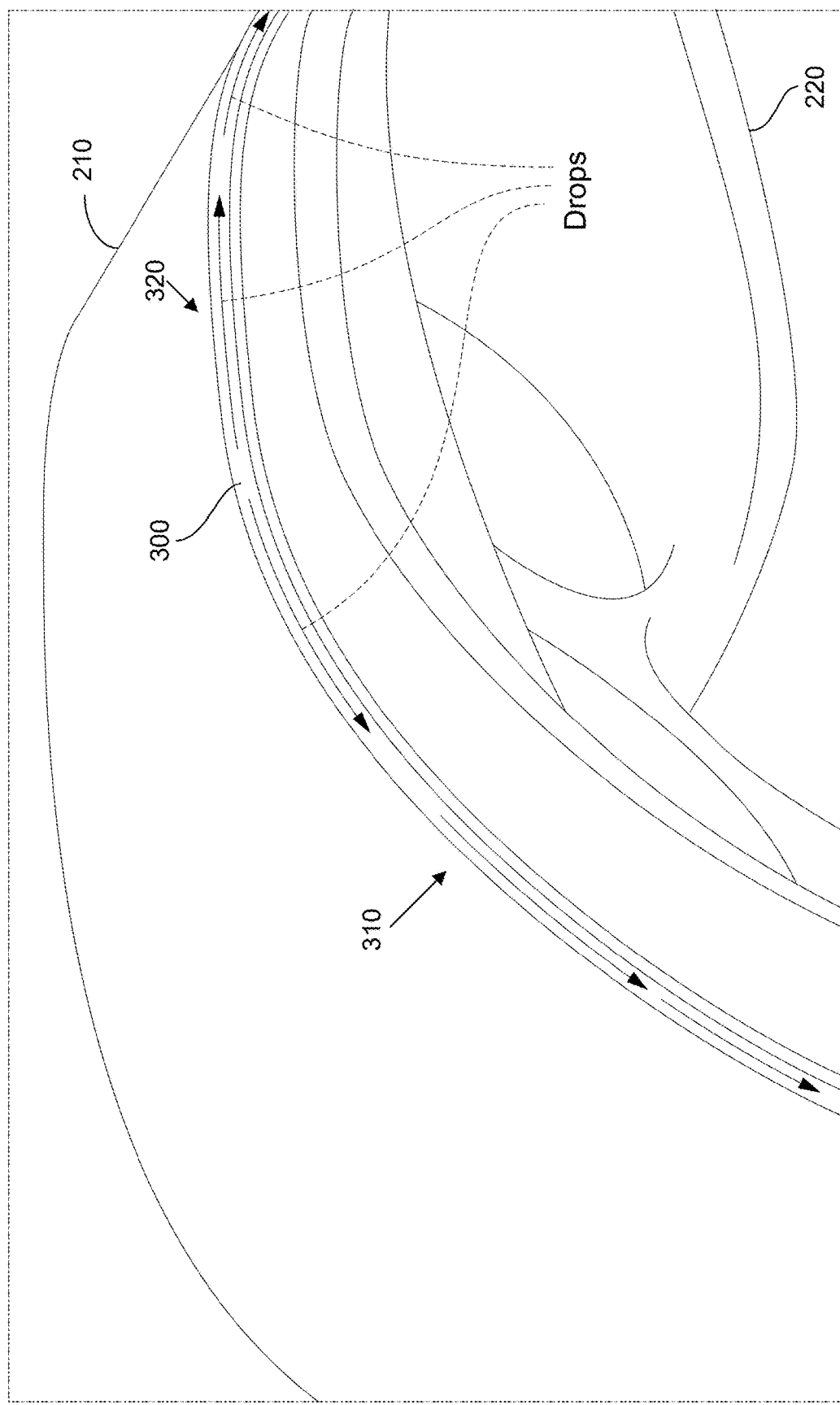
FIGS. 3A and 3B illustrate aspects of a sweat-prevention design for use with a MR headset, in accordance with some embodiments.
Figure 3B:
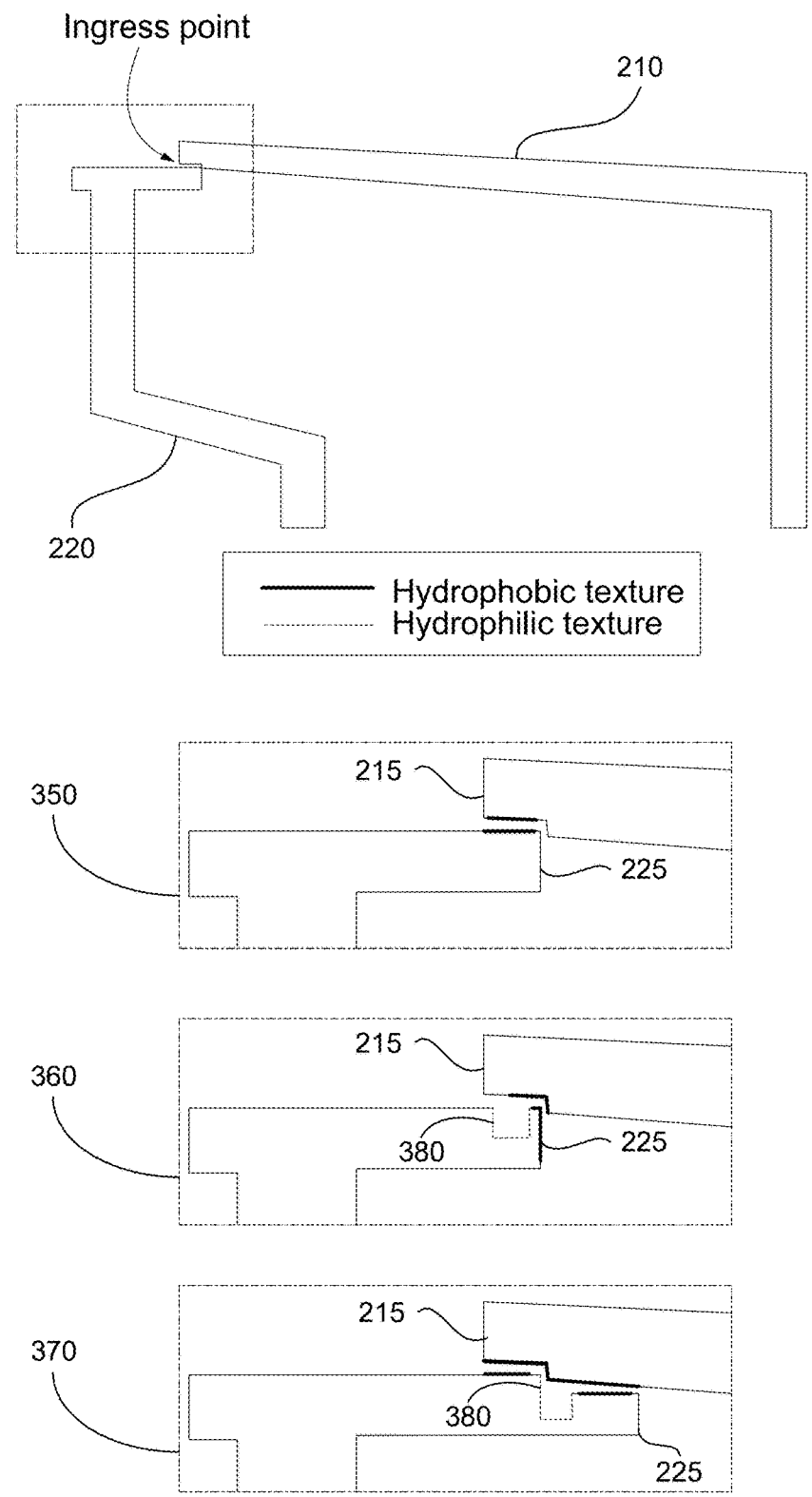

FIG. 2 illustrates that each of the first perimeter 215 and the second perimeter 225 can include textured surfaces (e.g., micro-textures), indicated by corresponding hatch patterns, which can include hydrophilic textures and/or hydrophobic textures, as described in more detail with respect to FIG. 3B.

FIGS. 3A and 3B illustrate aspects of a sweat-prevention design for use with the MR headset 100, in accordance with some embodiments. In accordance with some embodiments, the depictions of aspects of the MR headset 100 include the two-part housing 200 described with respect to FIG. 2, including the first part 210 and the second part 220.

FIG. 3A shows a perspective view of a portion of the two-part housing 200 described with respect to FIG. 2, after first part 210 and the second part 220 have been coupled to form a unitary housing structure (e.g., the housing 110). As illustrated by FIG. 3A, when the first part 210 and the second part 220 are coupled, a channel 300 is thereby formed by the first perimeter 215 of the first part 210 and the second perimeter 225 of the second part 220. As will be discussed in more detail below, the channel 300 can include different paths and path irregularities to improve the efficiency of the channel 300 for preventing sweat ingress into the housing 110. As described herein, path irregularities are features of the channel 300 which reduce or otherwise modify a velocity of sweat flow along the channel, and/or increase the length of the channel paths or the capacity of the channel 300 to hold sweat.

In accordance with some embodiments, the channel 300 is depicted as including two different paths 310 and 320, such that sweat entering the channel from a user's forehead may travel along either path depending on the location where the sweat enters the channel.

In some embodiments, tests (e.g., drop sweat tests) are performed to determine which path particular sweat drops will travel along the channel 300 based on providing simulation drops at different points along the first perimeter 215 and/or the second perimeter 225. In some embodiments, one 0.05 milliliter drop of sweat (e.g., artificial perspiration) is provided at each of five distinct locations during testing to determine reliability of the channel 300 for preventing ingress into the electronic and mechanical components of the housing 110. In some embodiments of the sweat and fluid flow direction testing, drops of artificial perspiration are placed at a plurality of distinct locations along the channel 300 (e.g., three distinct locations, five distinct locations, etc.), which allows for users to determine the behavior of sweat within the channel 300 in more realistic conditions.

FIG. 3B shows depictions of different coupling configurations of the first perimeter 215 of the first part 210 and the second perimeter 225 of the second part 220, in accordance with some embodiments. The top portion of FIG. 3B shows a cross-section of a coupling point between the first perimeter 215 of the first part 210 and the second perimeter 225 of the second part 220. And the configurations 350, 360, and 370 illustrate different alternative texturing and profiling techniques for configuring and arranging the first perimeter 215 and the second perimeter 225 to form the channel 300 with different quality based on the respective texturing and profiling techniques.

For example, a configuration 350 is shown that includes a coupling point between the first perimeter 215 and the second perimeter 225 where each respective perimeter has a hydrophobic texture on an inward facing portion, such that the respective hydrophobic portions of the respective perimeters are adjacent to one another, which may help to prevent ingress into the channel 300.

A configuration 360 is shown that includes a pocket 380 (e.g., a path irregularity) defined on or near the second perimeter 225 of the second part 220, where the channel comprises a hydrophilic texture, which may cause sweat ingress to the channel to be directed to the pocket 380. The first perimeter 215 and the second perimeter 225 also comprise hydrophobic textures past the inlet of the channel 300 and the pocket 380, such that sweat that ingresses into the pocket 380 of the channel is trapped in the pocket 380 or forced to egress out of the channel 300.

A configuration 370 is shown that includes the pocket 380 that includes the hydrophilic texture, and the first and second perimeter 215 and 225, respectively, each comprise hydrophobic textures that are located inside and outside the pocket 380. Thus, in embodiments using the configuration 370, sweat is repelled from the ingress point of the channel 300 and also from getting past the pocket 380, thereby trapping sweat that does ingress into the channel 300 within the pocket 380.

In some embodiments, seal bucks are used to test a seal formed by the first perimeter 215 and the second perimeter 225. In some embodiments, each seal buck configuration forms a distinct ingress point via the two coupled surfaces. For example, in a first configuration, a first layer includes a hydrophobic texture and forms an ingress point with a second layer. In a second configuration, a first layer has an L-shaped ledge with a hydrophobic texture and forms an ingress point with a second layer. In a third configuration, a second layer forms a channel, the second layer is configured to receive the first layer (which includes a hydrophobic texture) such that the first layer when received by the channel of the second layer forms an ingress point.

Example XR Systems

Figure 4A:
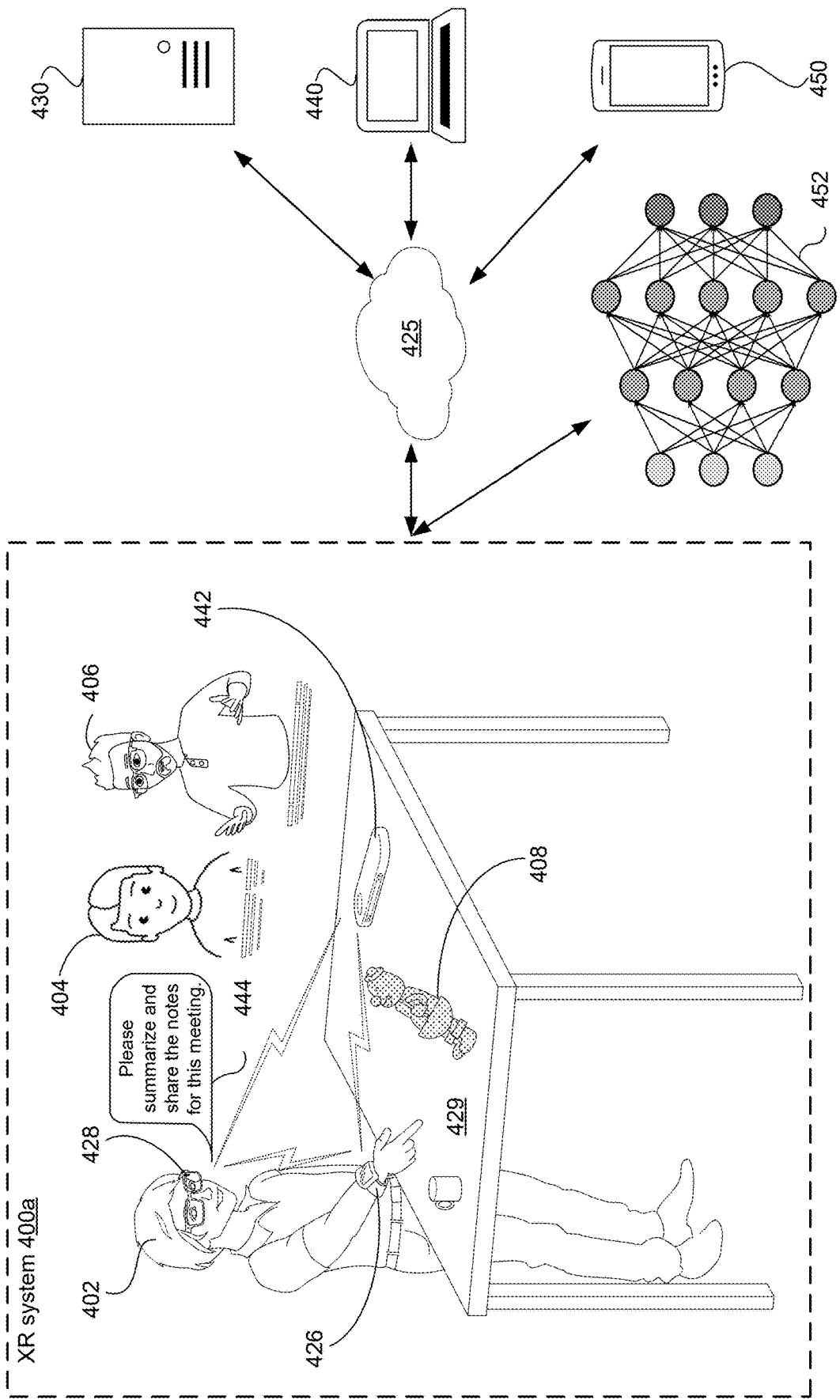
Figure 4B:
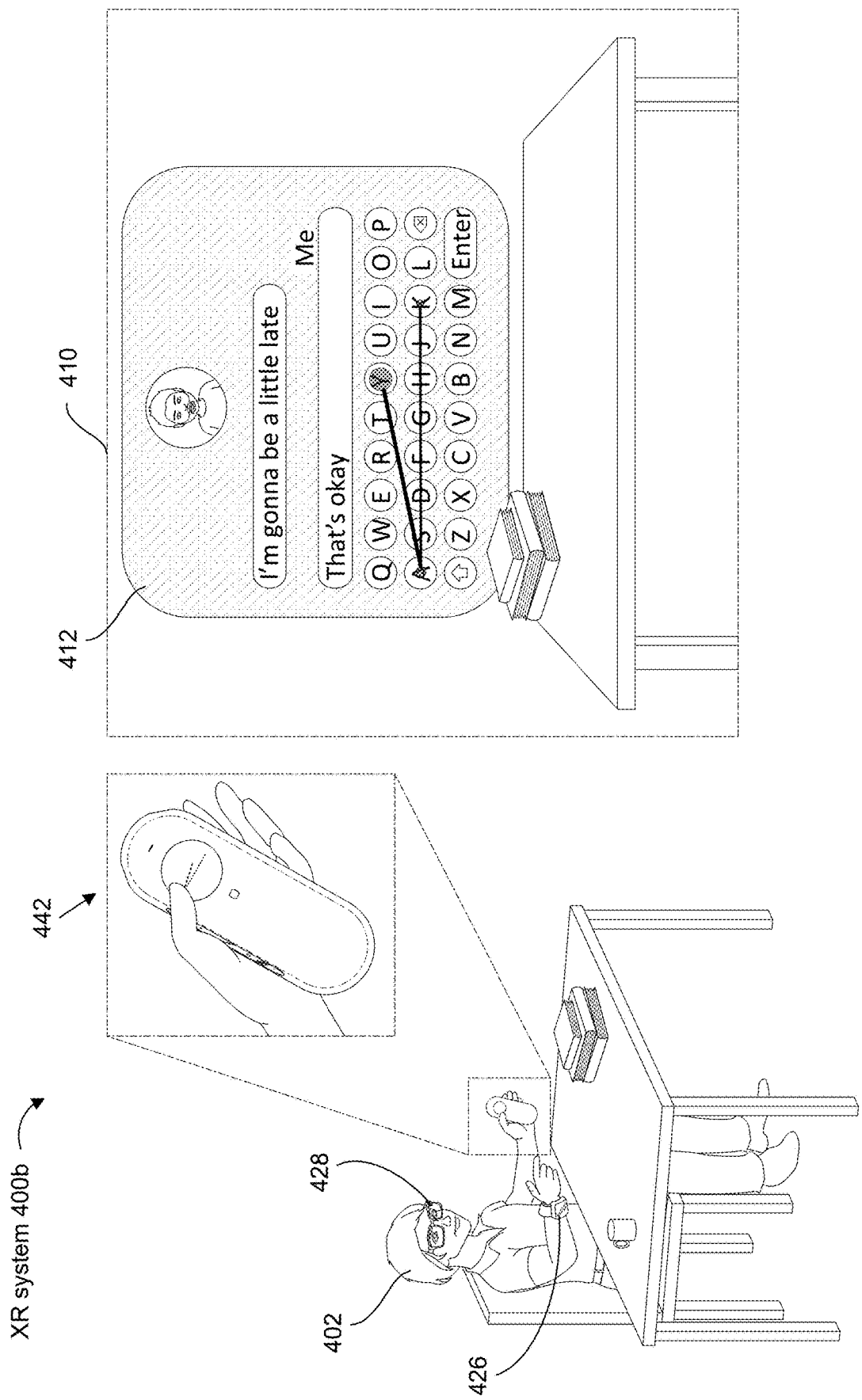
Figures 1, 4C:
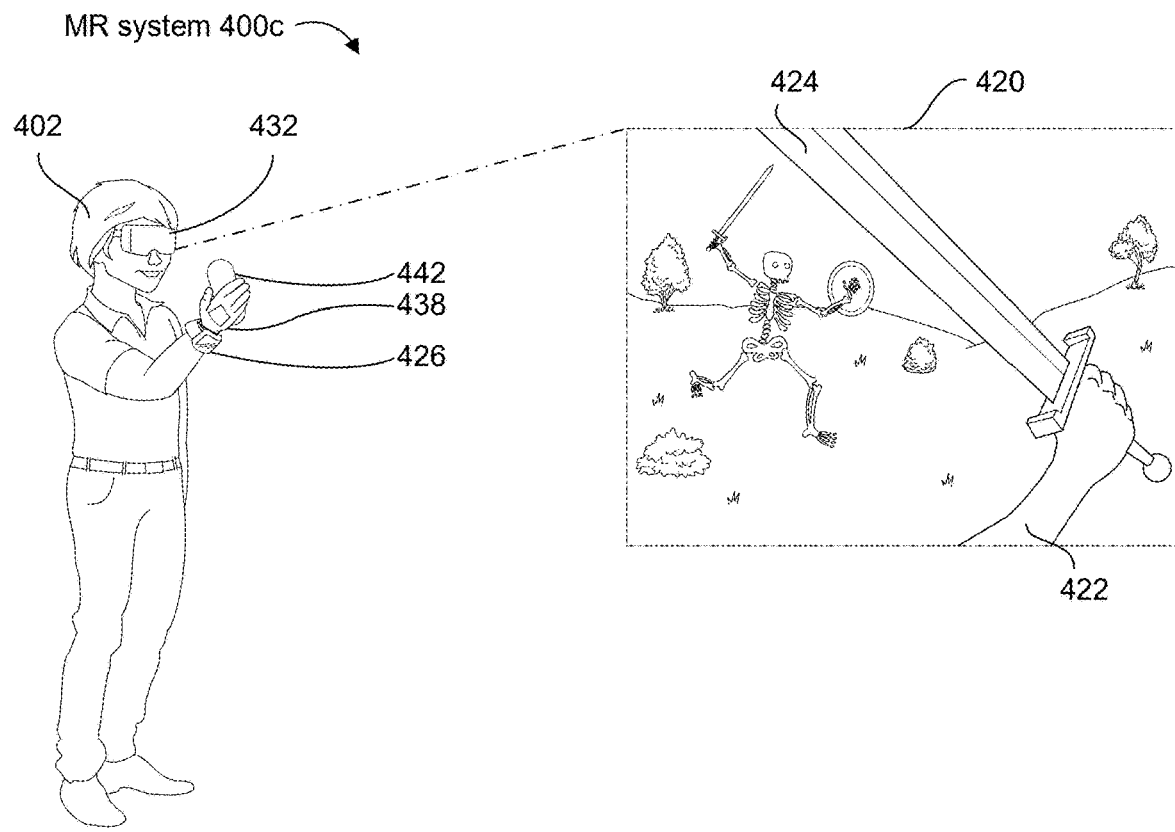
Figures 2, 4C:
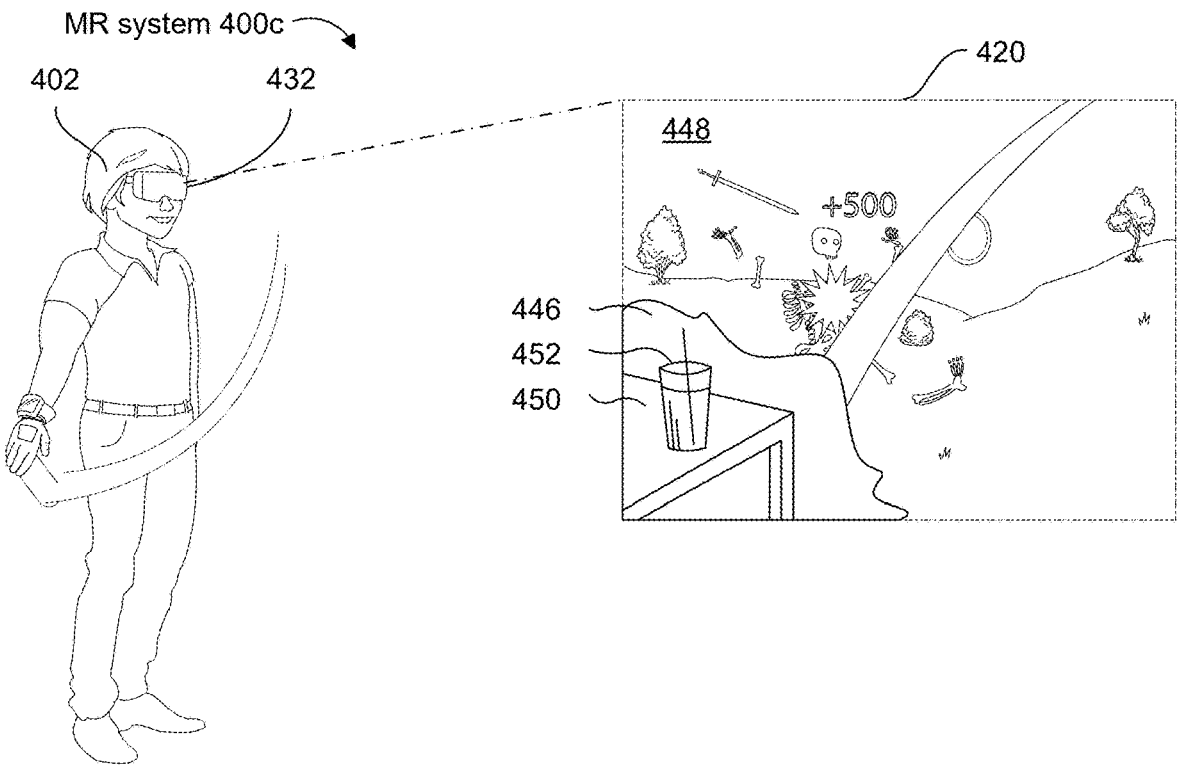

FIGS. 4A, 4B, 4C-1, and 4C-2, illustrate example XR systems that include AR and MR systems, in accordance with some embodiments. FIG. 4A shows a first XR system 400a and first example user interactions using a wrist-wearable device 426, a head-wearable device (e.g., AR device 428), and/or a handheld intermediary processing device (HIPD) 430. FIG. 4B shows a second XR system 400b and second example user interaction using a wrist-wearable device 426, AR device 428, and/or an HIPD 442. FIGS. 4C-1 and 4C-2 show a third MR system 400c and a third example user interaction using a wrist-wearable device 426, a head-wearable device (e.g., a MR device such as a virtual-reality (VR) device), and/or an HIPD 442. As the skilled artisan will appreciate upon reading the descriptions provided herein, the above-example AR and MR systems (described in detail below) can perform various functions and/or operations.

The wrist-wearable device 426, the head-wearable devices, and/or the HIPD 442 can communicatively couple via a network 425 (e.g., cellular, near field, Wi-Fi, personal area network, wireless LAN, etc.). Additionally, the wrist-wearable device 426, the head-wearable devices, and/or the HIPD 442 can also communicatively couple with one or more servers 430, computers 440 (e.g., laptops, computers, etc.), mobile devices 450 (e.g., smartphones, tablets, etc.), and/or other electronic devices via the network 425 (e.g., cellular, near field, Wi-Fi, personal area network, wireless LAN, etc.). Similarly, a smart textile-based garment, when used, can also communicatively couple with the wrist-wearable device 426, the head-wearable device(s), the HIPD 442, the one or more servers 430, the computers 440, the mobile devices 450, and/or other electronic devices via the network 425 to provide inputs.

Turning to FIG. 4A, a user 402 is shown wearing the wrist-wearable device 426 and the AR device 428, and having the HIPD 442 on their desk. The wrist-wearable device 426, the AR device 428, and the HIPD 442 facilitate user interaction with an AR environment. In particular, as shown by the first AR system 400a, the wrist-wearable device 426, the AR device 428, and/or the HIPD 442 cause presentation of one or more avatars 404, digital representations of contacts 406, and virtual objects 408. As discussed below, the user 402 can interact with the one or more avatars 404, digital representations of the contacts 406, and virtual objects 408 via the wrist-wearable device 426, the AR device 428, and/or the HIPD 442. In addition, the user 402 is also able to directly view physical objects in the environment, such as a physical table 429, through transparent lens(es) and waveguide(s) of the AR device 428. Alternatively, a MR device could be used in place of the AR device 428 and a similar user experience can take place, but the user would not be directly viewing physical objects in the environment, such as table 429, and would instead be presented with a virtual reconstruction of the table 429 produced from one or more sensors of the MR device (e.g., an outward facing camera capable of recording the surrounding environment).

The user 402 can use any of the wrist-wearable device 426, the AR device 428 (e.g., through physical inputs at the AR device and/or built in motion tracking of a user's extremities), a smart-textile garment, externally mounted extremity tracking device, the HIPD 442 to provide user inputs, etc. For example, the user 402 can perform one or more hand gestures that are detected by the wrist-wearable device 426 (e.g., using one or more EMG sensors and/or IMUs built into the wrist-wearable device) and/or AR device 428 (e.g., using one or more image sensors or cameras) to provide a user input. Alternatively, or additionally, the user 402 can provide a user input via one or more touch surfaces of the wrist-wearable device 426, the AR device 428, and/or the HIPD 442, and/or voice commands captured by a microphone of the wrist-wearable device 426, the AR device 428, and/or the HIPD 442. The wrist-wearable device 426, the AR device 428, and/or the HIPD 442 include an artificially intelligent (AI) digital assistant to help the user in providing a user input (e.g., completing a sequence of operations, suggesting different operations or commands, providing reminders, confirming a command). For example, the digital assistant can be invoked through an input occurring at the AR device 428 (e.g., via an input at a temple arm of the AR device 428). In some embodiments, the user 402 can provide a user input via one or more facial gestures and/or facial expressions. For example, cameras of the wrist-wearable device 426, the AR device 428, and/or the HIPD 442 can track the user 402's eyes for navigating a user interface.

The wrist-wearable device 426, the AR device 428, and/or the HIPD 442 can operate alone or in conjunction to allow the user 402 to interact with the AR environment. In some embodiments, the HIPD 442 is configured to operate as a central hub or control center for the wrist-wearable device 426, the AR device 428, and/or another communicatively coupled device. For example, the user 402 can provide an input to interact with the AR environment at any of the wrist-wearable device 426, the AR device 428, and/or the HIPD 442, and the HIPD 442 can identify one or more back-end and front-end tasks to cause the performance of the requested interaction and distribute instructions to cause the performance of the one or more back-end and front-end tasks at the wrist-wearable device 426, the AR device 428, and/or the HIPD 442. In some embodiments, a back-end task is a background-processing task that is not perceptible by the user (e.g., rendering content, decompression, compression, etc.), and a front-end task is a user-facing task that is perceptible to the user (e.g., presenting information to the user, providing feedback to the user, etc.). The HIPD 442 can perform the back-end tasks and provide the wrist-wearable device 426 and/or the AR device 428 operational data corresponding to the performed back-end tasks such that the wrist-wearable device 426 and/or the AR device 428 can perform the front-end tasks. In this way, the HIPD 442, which has more computational resources and greater thermal headroom than the wrist-wearable device 426 and/or the AR device 428, performs computationally intensive tasks and reduces the computer resource utilization and/or power usage of the wrist-wearable device 426 and/or the AR device 428.

In the example shown by the first AR system 400a, the HIPD 442 identifies one or more back-end tasks and front-end tasks associated with a user request to initiate an AR video call with one or more users (represented by the avatar 404 and the digital representation of the contact 406) and distributes instructions to cause the performance of the one or more back-end tasks and front-end tasks. In particular, the HIPD 442 performs back-end tasks for processing and/or rendering image data (and other data) associated with the AR video call and provides operational data associated with the performed back-end tasks to the AR device 428 such that the AR device 428 performs front-end tasks for presenting the AR video call (e.g., presenting the avatar 404 and the digital representation of the contact 406).

In some embodiments, the HIPD 442 can operate as a focal or anchor point for causing the presentation of information. This allows the user 402 to be generally aware of where information is presented. For example, as shown in the first AR system 400a, the avatar 404 and the digital representation of the contact 406 are presented above the HIPD 442. In particular, the HIPD 442 and the AR device 428 operate in conjunction to determine a location for presenting the avatar 404 and the digital representation of the contact 406. In some embodiments, information can be presented within a predetermined distance from the HIPD 442 (e.g., within five meters). For example, as shown in the first AR system 400a, virtual object 408 is presented on the desk some distance from the HIPD 430. Similar to the above example, the HIPD 430 and the AR device 428 can operate in conjunction to determine a location for presenting the virtual object 408. Alternatively, in some embodiments, presentation of information is not bound by the HIPD 430. More specifically, the avatar 404, the digital representation of the contact 406, and the virtual object 408 do not have to be presented within a predetermined distance of the HIPD 430. While an AR device 428 is described as working with an HIPD, a MR headset can be interacted with in the same way as the AR device 428.

User inputs provided at the wrist-wearable device 426, the AR device 428, and/or the HIPD 442 are coordinated such that the user can use any device to initiate, continue, and/or complete an operation. For example, the user 402 can provide a user input to the AR device 428 to cause the AR device 428 to present the virtual object 408 and, while the virtual object 408 is presented by the AR device 428, the user 402 can provide one or more hand gestures via the wrist-wearable device 426 to interact and/or manipulate the virtual object 408. While an AR device 428 is described as working with a wrist-wearable device 426, a MR headset can be interacted with in the same way as the AR device 428.

Integration of Artificial Intelligence with XR Systems

FIG. 4A illustrates an interaction in which an artificially intelligent (AI) virtual assistant can assist in requests made by a user 402. The AI virtual assistant can be used to complete open-ended requests made through natural language inputs by a user 402. For example, in FIG. 4A the user 402 makes an audible request 444 to summarize the conversation and then share the summarized conversation with others in the meeting. In addition, the AI virtual assistant is configured to use sensors of the XR system (e.g., cameras of an XR headset, microphones, and various other sensors of any of the devices in the system) to provide contextual prompts to the user for initiating tasks.

FIG. 4A also illustrates an example neural network 452 that is used to train an AI. Uses of AI are varied and encompass many distinct aspects of the devices and systems described herein. AI capabilities cover a diverse range of applications and deepen interactions between the user 402 and user devices (e.g., the AR device 428, a MR device 432, the HIPD 442, the wrist-wearable device 426, etc.). The AI discussed herein can be derived using many different training models, including, but not limited to, artificial neural networks (ANNs), deep neural networks (DNN), convolution neural networks (CNN), recurrent neural network (RNN), large language model (LLM), long short-term memory networks, transformer models, decision trees, random forests, support vector machines, k-nearest neighbors, genetic algorithms, Markov models, Bayesian networks, fuzzy logic systems, and deep reinforcement learnings. For devices and systems herein that employ multiple AIs, depending on the task, different models can be used. For example, for a natural language AI virtual assistant, an LLM can be used and for object detection of a physical environment a DNN can be used instead.

In another example, an AI virtual assistant can include many different AI models and based on the user's request, multiple AI models may be employed (concurrently, sequentially or a combination thereof). For example, an LLM-based AI can provide instructions for helping a user follow a recipe and the instructions can be based in part on another AI that is derived from an ANN, a DNN, a RNN, etc. that is capable of discerning what part of the recipe the user is on (e.g., object and scene detection).

As AI training models evolve, the operations and experiences described herein could potentially be performed with different models other than those listed above, and a person skilled in the art would understand that the above list is non-limiting.

A user 402 can interact with an AI through natural language inputs captured by a voice sensor, text inputs, or any other input modality that accepts natural language and/or a corresponding voice sensor module. In another instance, a user can provide an input by tracking an eye gaze of a user 402 via a gaze tracker module. Additionally, the AI can also receive inputs beyond those supplied by a user 402. For example, the AI can generate its response further based on environmental inputs (e.g., temperature data, image data, video data, ambient light data, audio data, GPS location data, inertial measurement (i.e., user motion) data, pattern recognition data, magnetometer data, depth data, pressure data, force data, neuromuscular data, heart rate data, temperature data, sleep data) captured in response to a user request by various types of sensors and/or their corresponding sensor modules. The sensors' data can be retrieved entirely from a single device (e.g., AR device 428) or from multiple devices that are in communication with each other (e.g., a system that includes at least two of: an AR device 428, a MR device 432, the HIPD 442, the wrist-wearable device 426, etc.). The AI can also access additional information (e.g., one or more servers 430, the computers 440, the mobile devices 450, and/or other electronic devices) via a network 425.

A non-limiting list of AI-enhanced functions includes, but is not limited to image recognition, speech recognition (e.g., automatic speech recognition), text recognition (e.g., scene text recognition), pattern recognition, natural language processing and understanding, classification, regression, clustering, anomaly detection, sequence generation, content generation, and optimization. In some embodiments, AI-enhanced functions are fully or partially executed on cloud computing platforms communicatively coupled to the user devices (e.g., the AR device 428, a MR device 432, the HIPD 442, the wrist-wearable device 426, etc.) via the one or more networks. The cloud computing platforms provide scalable computing resources, distributed computing, managed AI services, interference acceleration, pre-trained models, APIs, and/or other resources to support comprehensive computations required by the AI-enhanced function.

Example outputs stemming from the use of AI can include natural language responses, mathematical calculations, charts displaying information, audio, images, videos, texts, summaries of meetings, predictive operations based on environmental factors, classifications, pattern recognitions, recommendations, assessments, or other operations. In some embodiments, the generated outputs are stored on local memories of the user devices (e.g., the AR device 428, a MR device 432, the HIPD 442, the wrist-wearable device 426, etc.), storages of the external devices (servers, computers, mobile devices, etc.), and/or storages of the cloud computing platforms.

The AI-based outputs can be presented across different modalities (e.g., audio-based, visual-based, haptic-based, and any combination thereof) and across different devices of the XR system described herein. Some visual-based outputs can include the displaying of information on XR augments of an XR headset, user interfaces displayed at a wrist-wearable device, laptop device, mobile device, etc. On devices with or without displays (e.g., HIPD 442), haptic feedback can provide information to the user 402. An AI can also use the inputs described above to determine the appropriate modality and device(s) to present content to the user (i.e., a user walking on a busy road can be presented with an audio output instead of a visual output to avoid distracting the user 402).

Example AR Interaction

FIG. 4B shows the user 402 wearing the wrist-wearable device 426 and the AR device 428, and holding the HIPD 442. In the second XR system 400b, the wrist-wearable device 426, the AR device 428, and/or the HIPD 430 are used to receive and/or provide one or more messages to a contact of the user 402. In particular, the wrist-wearable device 426, the AR device 428, and/or the HIPD 430 detect and coordinate one or more user inputs to initiate a messaging application and prepare a response to a received message via the messaging application.

In some embodiments, the user 402 initiates, via a user input, an application on the wrist-wearable device 426, the AR device 428, and/or the HIPD 430 that causes the application to initiate on at least one device. For example, in the second AR system 400c the user 402 performs a hand gesture associated with a command for initiating a messaging application (represented by messaging user interface 412); the wrist-wearable device 426 detects the hand gesture; and, based on a determination that the user 402 is wearing AR device 428, causes the AR device 428 to present a messaging user interface 412 of the messaging application. The AR device 428 can present the messaging user interface 412 to the user 402 via its display (e.g., as shown by user 402's field of view 410). In some embodiments, the application is initiated and can be run on the device (e.g., the wrist-wearable device 426, the AR device 428, and/or the HIPD 442) that detects the user input to initiate the application, and the device provides another device operational data to cause the presentation of the messaging application. For example, the wrist-wearable device 426 can detect the user input to initiate a messaging application, initiate and run the messaging application, and provide operational data to the AR device 428 and/or the HIPD 442 to cause presentation of the messaging application. Alternatively, the application can be initiated and run at a device other than the device that detected the user input. For example, the wrist-wearable device 426 can detect the hand gesture associated with initiating the messaging application and cause the HIPD 442 to run the messaging application and coordinate the presentation of the messaging application.

Further, the user 402 can provide a user input provided at the wrist-wearable device 426, the AR device 428, and/or the HIPD 430 to continue and/or complete an operation initiated at another device. For example, after initiating the messaging application via the wrist-wearable device 426 and while the AR device 428 presents the messaging user interface 412, the user 402 can provide an input at the HIPD 442 to prepare a response (e.g., shown by the swipe gesture performed on the HIPD 442). The user 402's gestures performed on the HIPD 442 can be provided and/or displayed on another device. For example, the user 402's swipe gestures performed on the 430 are displayed on a virtual keyboard of the messaging user interface 412 displayed by the AR device 428.

In some embodiments, the wrist-wearable device 426, the AR device 428, the HIPD 442, and/or other communicatively coupled devices can present one or more notifications to the user 402. The notification can be an indication of a new message, an incoming call, an application update, a status update, etc. The user 402 can select the notification via the wrist-wearable device 426, the AR device 428, or the HIPD 442 and cause presentation of an application or operation associated with the notification on at least one device. For example, the user 402 can receive a notification that a message was received at the wrist-wearable device 426, the AR device 428, the HIPD 442, and/or other communicatively coupled device and provide a user input at the wrist-wearable device 426, the AR device 428, and/or the HIPD 442 to review the notification, and the device detecting the user input can cause an application associated with the notification to be initiated and/or presented at the wrist-wearable device 426, the AR device 428, and/or the HIPD 442.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR device 428 can present to the user 402 game application data and the HIPD 442 can use a controller to provide inputs to the game. Similarly, the user 402 can use the wrist-wearable device 426 to initiate a camera of the AR device 428, and the user can use the wrist-wearable device 426, the AR device 428, and/or the HIPD 442 to manipulate the image capture (e.g., zoom in or out, apply filters, etc.) and capture image data.

While an AR device 428 is shown as being capable of certain functions, it is understood that an AR device can be an AR device with varying functionalities based on costs and market demands. For example, an AR device may include a single output modality such as an audio output modality. In another example, the AR device may include a low-fidelity display as one of the output modalities, where simple information (e.g., text and/or low-fidelity images/video) is capable of being presented to the user. In yet another example, the AR device can be configured with user-facing LED(s) configured to provide a user with information, e.g., an LED around the right-side lens can illuminate to notify the wearer to turn right while directions are being provided or an LED on the left side can illuminate to notify the wearer to turn left while directions are being provided. In another embodiment, the AR device can include an outward facing projector such that information (e.g., text information, media, etc.) may be displayed on the palm of a user's hand or other suitable surface (e.g., a table, whiteboard, etc.). In yet another embodiment, information may also be provided by locally dimming portions of a lens to emphasize portions of the environment in which the user's attention should be directed. These examples are non-exhaustive and features of one AR device described above can be combined with features of another AR device described above. While features and experiences of an AR device have been described in the preceding sections, it is understood that the described functionalities and experiences can be applied in a comparable manner to a MR headset, which is described below in the proceeding sections.

Example MR Interaction

Turning to FIGS. 4C-1 and 4C-2, the user 402 is shown wearing the wrist-wearable device 426 and an MR device 432 (e.g., a device capable of providing either an entirely VR experience or an MR experience that displays object(s) from a physical environment at a display of the device), and holding the HIPD 442. In the third MR system 400c, the wrist-wearable device 426, the MR device 432, and/or the HIPD 442 are used to interact within an MR environment, such as a VR game or other MR/VR application. While the MR device 432 presents a representation of a VR game (e.g., first MR game environment 420) to the user 402, the wrist-wearable device 426, the MR device 432, and/or the HIPD 442 detect and coordinate one or more user inputs to allow the user 402 to interact with the VR game.

In some embodiments, the user 402 can provide a user input via the wrist-wearable device 426, the MR device 432, and/or the HIPD 442 that causes an action in a corresponding MR environment. For example, the user 402 in the third MR system 400c (shown in FIG. 4C-1) raises the HIPD 442 to prepare for a swing in the first MR game environment 420. The MR device 432, responsive to the user 402 raising the HIPD 442, causes the MR representation of the user 422 to perform a similar action (e.g., raise a virtual object, such as a virtual sword 424). In some embodiments, each device uses respective sensor data and/or image data to detect the user input and provide an accurate representation of the user 402's motion. For example, image sensors (e.g., SLAM cameras or other cameras) of the HIPD 442 can be used to detect a position of the 424 relative to the user 402's body such that the virtual object can be positioned appropriately within the first MR game environment 420; sensor data from the wrist-wearable device 426 can be used to detect a velocity at which the user 402 raises the HIPD 442 such that the MR representation of the user 422 and the virtual sword 424 are synchronized with the user 402's movements; and image sensors of the MR device 432 can be used to represent the user 402's body, boundary conditions, or real-world objects within the first MR game environment 420.

In FIG. 4C-2, the user 402 performs a downward swing while holding the HIPD 442. The user 402's downward swing is detected by the wrist-wearable device 426, the MR device 432, and/or the HIPD 442 and a corresponding action is performed in the first MR game environment 420. In some embodiments, the data captured by each device is used to improve the user's experience within the MR environment. For example, sensor data of the wrist-wearable device 426 can be used to determine a speed and/or force at which the downward swing is performed and image sensors of the HIPD 442 and/or the MR device 432 can be used to determine a location of the swing and how it should be represented in the first MR game environment 420, which, in turn, can be used as inputs for the MR environment (e.g., game mechanics, which can use detected speed, force, locations, and/or aspects of the user 402's actions to classify a user's inputs (e.g., user performs a light strike, hard strike, critical strike, glancing strike, miss) or calculate an output (e.g., amount of damage)).

FIG. 4C-2 further illustrates that a portion of the physical environment is reconstructed and displayed at a display of the MR device 432 while the MR game environment 420 is being displayed. In this instance, a reconstruction of the physical environment 446 is displayed in place of a portion of the MR game environment 420 when object(s) in the physical environment are potentially in the path of the user (e.g., a collision with the user and an object in the physical environment are likely). Thus, this example MR game environment 420 includes (i) an immersive VR portion 448 (e.g., an environment that does not have a corollary counterpart in a nearby physical environment) and (ii) a reconstruction of the physical environment 446 (e.g., table 450 and cup 452). While the example shown here is a MR environment that shows a reconstruction of the physical environment to avoid collisions, other uses of reconstructions of the physical environment can be used, such as defining features of the virtual environment based on the surrounding physical environment (e.g., a virtual column can be placed based on an object in the surrounding physical environment (e.g., a tree)).

While the wrist-wearable device 426, the MR device 432, and/or the HIPD 442 are described as detecting user inputs, in some embodiments, user inputs are detected at a single device (with the single device being responsible for distributing signals to the other devices for performing the user input). For example, the HIPD 442 can operate an application for generating the first MR game environment 420 and provide the MR device 432 with corresponding data for causing the presentation of the first MR game environment 420, as well as detect the 402's movements (while holding the HIPD 442) to cause the performance of corresponding actions within the first MR game environment 420. Additionally, or alternatively, in some embodiments, operational data (e.g., sensor data, image data, application data, device data, and/or other data) of one or more devices is provided to a single device (e.g., the HIPD 442) to process the operational data and cause respective devices to perform an action associated with processed operational data.

In some embodiments, the user 402 can wear a wrist-wearable device 426, wear a MR device 432, wear a smart textile-based garment 438 (e.g., wearable haptic gloves), and/or hold an HIPD 442 device. In this embodiment, the wrist-wearable device 426, the MR device 432, and/or the smart textile-based garment 438 are used to interact within an MR environment (e.g., any AR or MR system described above in reference to FIGS. 4A-4B). While the MR device 432 presents a representation of a MR game (e.g., second MR game environment 430) to the user 402, the wrist-wearable device 426, the MR device 432, and/or the smart textile-based garments 438 detect and coordinate one or more user inputs to allow the user 402 to interact with the MR environment.

In some embodiments, the user 402 can provide a user input via the wrist-wearable device 426, an HIPD 442, the MR device 432, and/or the smart textile-based garments 438 that causes an action in a corresponding MR environment. For example, the user 402. In some embodiments, each device uses respective sensor data and/or image data to detect the user input and provide an accurate representation of the user 402's motion. While four different input devices are shown (e.g., a wrist-wearable device 426, a MR device 432, a HIPD 442, and a smart textile-based garment 438) each one of these input devices entirely on their own can provide inputs for fully interacting with the MR environment. For example, the wrist-wearable device 426 can provide sufficient inputs on its own for interacting with the MR environment. In some embodiments, if multiple input devices are used (e.g., a wrist-wearable device 426 and the smart textile-based garment 438) sensor fusion can be utilized to ensure inputs are correct. While multiple input devices are described, it is understood that other input devices can be used in conjunction or on their own instead, such as, but not limited to, external motion tracking cameras, other wearable devices fitted to different parts of a user, apparatuses that allow for a user to experience walking in a MR environment while remaining substantially stationary in the physical environment, etc.

As described above, the data captured by each device is used to improve the user's experience within the MR environment. Although not shown, the smart textile-based garments 438 can be used in conjunction with an MR device and/or an HIPD 442.

FIG. 5 illustrates an example method 500 for assembling the two-part housing 200 for guiding perspiration to desired channels (e.g., the channel 300) to avoid negative impacts to electrical and mechanical functions of a MR headset, in accordance with some embodiments.

(A1) The method 500 includes coupling (510) a first part (e.g., the first part 210) of the two-part housing 200 to a second part (e.g., the second part 220) of the MR headset 100.

When the first part 210 and the second part 220 of the two-part housing 200 are coupled, they form (520) a channel defined by a first perimeter (e.g., the first perimeter 215) of the first part 210 of the two-part housing 200 and a second perimeter (e.g., the second perimeter 225) of the second part 220 of the two-part housing 200.

The channel is configured to guide perspiration along the first perimeter of the first part or the second perimeter of the second part (530). For example, as illustrated by FIG. 3A, the channel can include one or more channel paths (e.g., the channel path 310, the channel path 320), where perspiration that enters the channel 300 is caused to travel along one of the channel paths.

(A2) In some embodiments of A1, the channel includes (540) a set of path irregularities, each respective path irregularity is configured to: (i) reduce a flow velocity of the perspiration being guided along the first perimeter of the first part or the second perimeter of the second part, (ii) increase a path length of the channel such that perspiration guided along the first perimeter of the first part, or the second perimeter of the second part travels a longer path before reaching an end of the channel, and/or (iii) increase a volumetric perspiration capacity of the channel.

(A3) In some embodiments of A1 or A2, the set of path irregularities includes (550) one or more pockets defined in the first perimeter or the second perimeter, the pockets configured to collect perspiration being guided along the channel. For example, the second and third configurations 360 and 370 shown in FIG. 3B include the pocket 380.

(A4) In some embodiments of any one of A1 to A3, the set of path irregularities includes (560) a tortuous path that deviates from a direction along the first perimeter or the second perimeter. For example, the tortuous path may include jagged edges, a zig-zag pattern, and the like. In some embodiments, the tortuous path of the channel causes the channel to have a length that is at least 1.25 of the length of the first perimeter 215 or the second perimeter 225.

(A5) In some embodiments of any one of A1 to A4, the channel includes (570) a hydrophilic portion configured to receive perspiration guided along the channel, and the channel includes a hydrophobic portion configured to repel perspiration guided along the channel.

(A6) In some embodiments of A5, the hydrophilic portion and the hydrophobic portion are formed on the first and/or second perimeters of the first and/or second parts of the two-part housing (e.g., via respective molding processes for molding the first part and the second part of the two-part housing). In some embodiments, a respective hydrophobic portion formed on one of the respective perimeters of the two-part housing is configured to be positioned adjacently to a respective hydrophilic portion of the other respective perimeter of the two-part housing.

(A7) In some embodiments of A1 to A6, the channel includes a c-channel (e.g., a structural channel, a parallel flange channel) that includes a recessed portion of the first perimeter or the second perimeter.

(B1) In some embodiments, a two-part housing is configured to be used for any suitable combination of features of the method of assembly of A1 to A7.

(C1) In some embodiments, a MR headset includes a two-part housing having any suitable combination of the features produced by the method of assembly of A1 to A7.

While some experiences are described as occurring on an AR device and other experiences described as occurring on a MR device, one skilled in the art would appreciate that experiences can be ported over from a MR device to an AR device, and vice versa.

Some definitions of devices and components that can be included in some or all of the example devices discussed are defined here for ease of reference. A skilled artisan will appreciate that certain types of the components described may be more suitable for a particular set of devices, and less suitable for a distinct set of devices. But subsequent reference to the components defined here should be considered to be encompassed by the definitions provided.

In some embodiments, example devices and systems, including electronic devices and systems, will be discussed. Such example devices and systems are not intended to be limiting, and one of skill in the art will understand that alternative devices and systems to the example devices and systems described herein may be used to perform the operations and construct the systems and device that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles and music players, as well as the example electronic devices discussed herein. As described herein, an intermediary electronic device is a device that sits between two other electronic devices, and/or a subset of components of one or more electronic devices and facilitates communication, and/or data processing and/or data transfer between the respective electronic devices and/or electronic components.

The foregoing descriptions of FIGS. 4A to 4C-2 provided above are intended to augment the description provided in reference to FIGS. 1A to 3E. While terms in the following description may not be identical to terms used in the foregoing description, a person having ordinary skill in the art would understand these terms to have the same meaning.

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A two-part housing of a mixed-reality (MR) headset, comprising:
    a first part of the two-part housing;
    a second part of the two-part housing; and
    a channel formed by coupling the first part of the two-part housing to the second part of the two-part housing, the channel defined by a first portion of a first perimeter of the first part of the two-part housing overlapping a first portion of a second perimeter of the second part of the two-part housing, wherein a second portion of the second perimeter of the second part of the two-part housing extends away from the channel,
    wherein:
        the channel is configured to guide perspiration along the first perimeter of the first part or the second perimeter of the second part away from electronic and mechanical components housed in the two-part housing.

2. The two-part housing of claim 1, wherein the channel includes a set of path irregularities, each respective path irregularity configured to:
   reduce a flow velocity of the perspiration being guided along the first perimeter of the first part or the second perimeter of the second part;
   increase a path length of the channel such that perspiration guided along the first perimeter of the first part, or the second perimeter of the second part travels a longer path before reaching an end of the channel; and/or
   increase a volumetric perspiration capacity of the channel.

3. The two-part housing of claim 2, wherein the set of path irregularities includes one or more pockets defined in the first perimeter or the second perimeter, the pockets configured to collect perspiration being guided along the channel.

4. The two-part housing of claim 3, wherein the one or more pockets each comprise a hydrophilic portion configured to receive perspiration guided along the channel.

5. The two-part housing of claim 2, wherein the set of path irregularities includes a tortuous path that deviates from a direction along the first perimeter or the second perimeter.

6. The two-part housing of claim 1, wherein the first portion of the first perimeter of the first part of the two-part housing comprises a first hydrophobic portion, wherein the first portion of the second perimeter of the second part of the two-part housing comprises a second hydrophobic portion adjacent to the first hydrophobic portion, the first hydrophobic portion and the second hydrophobic portion configured to repel perspiration guided along the channel.

7. The two-part housing of claim 1, wherein the channel is a c-channel that includes a recessed portion of a respective perimeter of the first perimeter or the second perimeter.

8. A mixed-reality (MR) headset, comprising:
   a two-part housing configured to house electronic and mechanical components used to present MR content, the two-part housing including a first part of the two-part housing and a second part of the two-part housing; and
   a channel formed by coupling the first part of the two-part housing to the second part of the two-part housing, the channel defined by a first portion of a first perimeter of the first part of the two-part housing overlapping a first portion of a second perimeter of the second part of the two-part housing, wherein a second portion of the second perimeter of the second part of the two-part housing extends away from the channel,
   wherein:
      the channel is configured to guide perspiration along the first perimeter of the first part or the second perimeter of the second part away from the electronic and mechanical components housed in the two-part housing.

9. The MR headset of claim 8, wherein the channel includes a set of path irregularities, each respective path irregularity configured to:
   reduce a flow velocity of the perspiration being guided along the first perimeter of the first part or the second perimeter of the second part;
   increase a path length of the channel such that perspiration guided along the first perimeter of the first part, or the second perimeter of the second part travels a longer path before reaching an end of the channel; and/or
   increase a volumetric perspiration capacity of the channel.

10. The MR headset of claim 9, wherein the set of path irregularities includes one or more pockets defined in the first perimeter or the second perimeter, the pockets configured to collect perspiration being guided along the channel.

11. The MR headset of claim 10, wherein the one or more pockets each comprise a hydrophilic portion configured to receive perspiration guided along the channel.

12. The MR headset of claim 9, wherein the set of path irregularities includes a tortuous path that deviates from a direction along the first perimeter or the second perimeter.

13. The MR headset of claim 8, wherein the first portion of the first perimeter of the first part of the two-part housing comprises a first hydrophobic portion, wherein the first portion of the second perimeter of the second part of the two-part housing comprises a second hydrophobic portion adjacent to the first hydrophobic portion, the first hydrophobic portion and the second hydrophobic portion configured to repel perspiration guided along the channel.

14. A method of assembling a mixed-reality (MR) headset, comprising:
   coupling a first part of a two-part housing and a second part of a two-part housing, thereby forming a channel defined by a first portion of a first perimeter of the first part of the two-part housing overlapping a first portion of a second perimeter of the second part of the two-part housing, wherein a second portion of the second perimeter of the second part of the two-part housing extends away from the channel,
   wherein:
      the channel is configured to guide perspiration along the first perimeter of the first part or the second perimeter of the second part away from electronic and mechanical components housed in the two-part housing.

15. The method of claim 14, wherein the channel includes a set of path irregularities, each respective path irregularity configured to:
   reduce a flow velocity of the perspiration being guided along the first perimeter of the first part or the second perimeter of the second part;
   increase a path length of the channel such that perspiration guided along the first perimeter of the first part, or the second perimeter of the second part travels a longer path before reaching an end of the channel; and/or
   increase a volumetric perspiration capacity of the channel.

16. The method of claim 15, wherein the set of path irregularities includes one or more pockets defined in the first perimeter or the second perimeter, the pockets configured to collect perspiration being guided along the channel.

17. The method of claim 16, wherein the one or more pockets each comprise a hydrophilic portion configured to receive perspiration guided along the channel.

18. The method of claim 15, wherein the set of path irregularities includes a tortuous path that deviates from a direction along the first perimeter or the second perimeter.

19. The method of claim 14, wherein the first portion of the first perimeter of the first part of the two-part housing comprises a first hydrophobic portion, wherein the first portion of the second perimeter of the second part of the two-part housing comprises a second hydrophobic portion adjacent to the first hydrophobic portion, the first hydrophobic portion and the second hydrophobic portion configured to repel perspiration guided along the channel.

20. The method of claim 14, wherein the channel is a c-channel that includes a recessed portion of a respective perimeter of the first perimeter or the second perimeter.

* * * * *